United States Patent [19]
Landon et al.

[11] Patent Number: 5,932,988
[45] Date of Patent: Aug. 3, 1999

[54] APPARATUS AND METHODS FOR MANUFACTURING ELECTRODES

[75] Inventors: Frank L. Landon, Tustin, Calif.; Edward K. Merewether, Placitas, N.Mex.; Christopher J. Obaditch, Newport Beach; James K. Clark, Irvine, both of Calif.

[73] Assignee: Fluor Corporation, Irvine, Calif.

[21] Appl. No.: 09/064,481

[22] Filed: Apr. 22, 1998

[51] Int. Cl.$^6$ ..................................... H01M 10/44
[52] U.S. Cl. ............................. 320/100; 429/209
[58] Field of Search ................... 320/100, 107, 320/139; 429/90, 208, 209, 248

[56] References Cited

U.S. PATENT DOCUMENTS 3,990,098  11/1976  Mastrangelo .
5,789,100  8/1998  Burroughs et al. ...................... 429/90

Primary Examiner—Edward H. Tso
Attorney, Agent, or Firm—Robert D. Fish; Crockett & Fish

[57] ABSTRACT

Electrodes are cured through application of modulated electrical signals. In preferred embodiments the signal comprises pulsed currents, and in particularly preferred embodiments the signal comprises a train of both forward and reversed pulses, with modulation of the duty cycle by pulse width modulation during the curing process.

7 Claims, 1 Drawing Sheet

APPARATUS AND METHODS FOR MANUFACTURING ELECTRODES

FIELD OF THE INVENTION

The field of the invention is electrodes, including especially curing of electrodes in the conversion of green batteries.

BACKGROUND OF THE INVENTION

There are many different types of electrodes, ranging from essentially non-consumed electrodes such as those found in batteries and electro-hydrolysis, to consumable electrodes found in electroplating and electro-remediation. There are also many different methods of producing electrodes. Perhaps the simplest method is providing an electrode as a solid mass of metal or alloy. Solid copper, platinum, silver, lithium and zinc electrodes, for example, are all widely employed. Other methods involve sputter coating or other application of a conducting material onto a substrate.

Negative battery plates in lead-acid batteries typically fall into the substrate coated type of electrodes. Such electrodes are generally prepared by placing a lead oxide paste onto a lead grid, where the lead serves as both an electrical conductor and a mechanical frame for the paste. The lead in the frame is normally alloyed with a small proportion of a second metal, such as antimony, in order to stiffen the grid and allow it to be subjected to normal processing. After the lead grids have been pasted with lead oxide paste, opposed plates are disposed in a sulfuric acid bath and subjected to a charging cycle, whereby positive and negative plates are formed. In the case of the negative plates, the lead oxide paste is converted to sponge lead, and the plates are then ready for incorporation into a battery.

The heavy metallic grid can also be eliminated in a negative battery plate by substituting a grid composed of a light weight, non-conductive material that has an initial minimal degree of conductivity imparted thereto. The grid is then pasted with the desired metal oxide, and converted to the elemental metal by electrolysis. The conversion of the oxide to metal by electrolysis may be initiated by a single conductive lug in contact with the battery paste at one corner of the grid, a plastic grid may be provided with a thin coating of metal by electrode position, or a separate conducting element may be pressed into contact with the battery paste during charging and then removed when charging has been completed. Although the conductivity of the plate is initially fairly low, the electrolytic metal initially formed progressively increases the conductivity of the plate and sustains and accelerates the oxide to metal conversion.

Each of these processes, which can be generically referred to as conversion of "green "batteries, generally involves high costs, including expenditures of relatively large amounts of energy. It is also common for heating and other degradation of the sulphuric acid or other electrolyte to occur, requiring the electrolyte to be replaced several times during a single conversion process. At least some of these problems are related to increased internal resistance developed during the conversion process.

Thus, there is a continuing need to improve electrode manufacturing processes, and in particular to improve curing of electrodes during green battery conversion.

SUMMARY OF THE INVENTION

Methods and apparatus are provided in which an electrode is cured through application of a modulated electrical signal. In preferred embodiments the signal comprises pulsed currents, and in particularly preferred embodiments the signal comprises a train of both forward and reversed pulses, where the duty cycle is modulated during the curing of the curing process by pulse width modulation.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
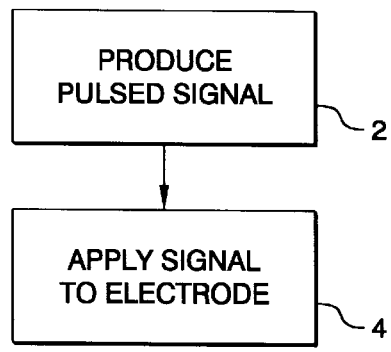
FIG. 1 is a simplified block diagram illustrating steps in the curing an electrode through application of a modulated electrical signal.

FIG. 1 shows two steps for curing an electrode. The first step 2 comprises producing a modulated electrical signal, and the second step 4 comprises applying the signal to an electrode. The signal is preferably applied until the curing is substantially complete, and a temperature or other sensor (see FIG. 4) may provide feedback to assist in controlling the process.

As used herein, the term "curing" refers generically to modification of a chemical or physical characteristic of an electrode during manufacture, and the term "conversion of green batteries" refers more specifically to curing of electrodes which will ultimately comprise battery electrodes. The term "electrode" refers to a solid component through which electricity can be introduced into, or removed from a system. Thus, the cathode and anode of a battery are electrodes.

The term "signal" is used herein in its ordinary sense, and can include discreet or non-discreet pulses of various shapes and durations. Square, triangular, and other waveforms are especially contemplated. Circuits for achieving such signals are known with respect to the charging of batteries, and in connection with various aspects of electroplating. Examples are U.S. Pat. No. 5,433,559 to Hall et al. (Jun. 6, 1995) and U.S. Pat. No. 4,774,449 to Elkins (Sep. 27, 1988). To our knowledge, however, pulsed currents have never before been applied to cure electrodes, or more specifically in the conversion of green batteries.

Figure 2:
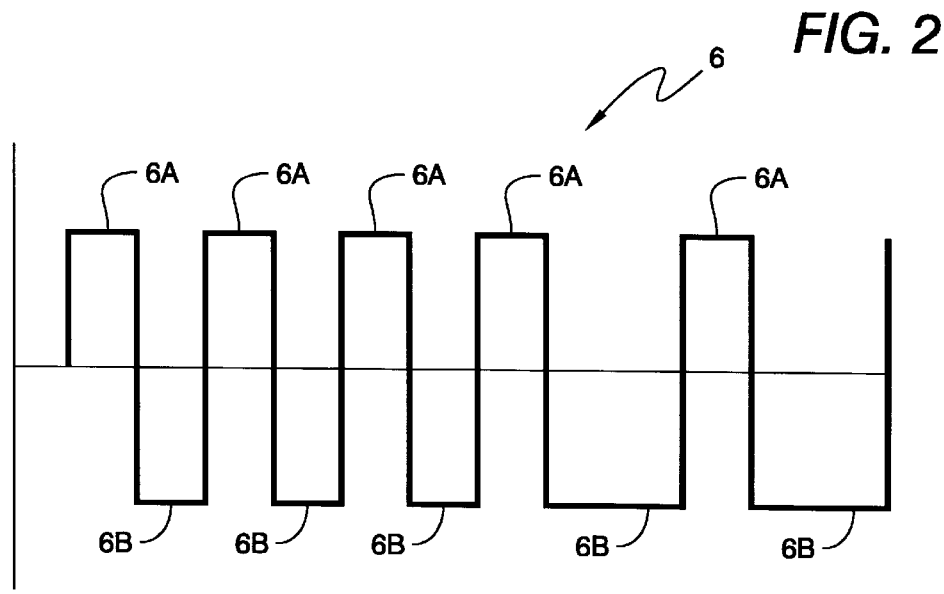
FIG. 2 is a timing diagram of a preferred embodiment of the signal of FIG. 1.

FIG. 2 shows preferred signals employed to convert green electrodes for a lead-acid battery. Here, the signal 6 comprises both forward 6A and reverse 6B square wave pulses, in which the durations of the reverse pulses are varied over the course of the curing process. As used herein, the term "forward pulse" refers to a pulse having a polarity opposite the natural EMF of the electrode during the curing process, while the term "reverse pulse" refers to a pulse having the same polarity having as the natural EMF of the electrode during the curing process.

In preliminary experiments, a twelve cell battery was converted using a 50.2 Volt power source over the course of about 21 hours. The duration of the forward pulses remained constant at about 1.5 seconds, while the duration of the reverse pulses was varied to maintain the temperature of the acid bath at about 130° Fahrenheit. Using these parameters the reverse pulse widths varied from an initial value of about 10 milliseconds down to a minimum of about 2 milliseconds, and then back up to about 7 milliseconds. The current also varied during the conversion process, rising to a peak of about 52 to 53 Amps, and averaging about 25 Amps. This compared quite favorably with a non-pulsed control conversion which required about 42 hours at an average of about 25 Amps to accomplish an equivalent conversion. This example, of course, is merely illustrative of the general principle, and other parameters may be developed which work as well, or better, than that described herein.

It should be recognized that pulse width modulation is only one class of possible signal modulation which could be employed herein. For example, signals can be modulated by varying the waveform over time, as for example by moving from a triangular or saw-toothed wave to a sine wave or a square wave. Signals can also be modulated by varying the width of "spaces" between waves, or by amplitude modification. Still further, one can modulate a signal having a constant underlying frequency by omitting forward pulses, reverse pulses, or both. All of the above-mentioned forms of pulse modulation accomplish essentially the same result—namely, altering the total power, and hence the total current delivered to the electrode.

Figure 3:
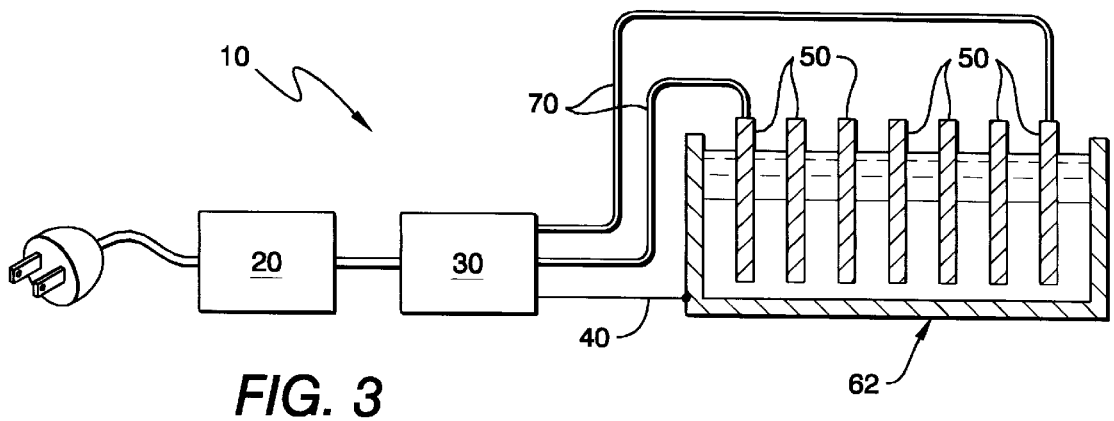
FIG. 3 is a simplified block diagram of an embodiment of an apparatus applying the method of FIG. 1.

In FIG. 3 a conversion apparatus 10 generally comprises a DC power source 20, a controller 30, and a temperature feedback loop 40. These components are used to convert green electrodes 50 contained in a battery casing or other container 62 through cables 70.

The power source 20 may be entirely conventional, so long as it satisfies the voltage and current requirements for the number and type of electrodes being cured. It is contemplated, for example, to utilize either a constant current or a constant voltage supply. There is no presently preferred model or capacity. The controller 30 and feedback loop 40 can also be conventional. With minimal modification, the relevant components are taught throughout the art, including U.S. Pat. No. 4,554,500 to Sokira (Nov. 19, 1985); U.S. Pat. No. 4,234,839 to King and Bowman (Nov. 18, 1980); U.S. Pat. No. 4,862,013 to Knopka (Aug. 29, 1989); U.S. Pat. No. 4,607,208 to Vreeland (Aug. 19, 1986); and U.S. Pat. No. 5,198,743 to McClure er al. (Mar. 30, 1993). The remaining components, the electrodes 50, the container 62 and the cables 70 are also known in the art.

Thus, while specific embodiments and applications of using modulated signals to convert a green battery have been shown and described, it would be apparent to those skilled in the art that many more modifications are possible without departing from the inventive concepts herein. The invention, therefore, is not to be restricted except in the spirit of the appended claims.

What is claimed is:

1. A method of curing an electrode comprising the following steps:

producing a modulated electrical signal; and applying the modulated signal to the electrode.

2. The method of claim 1 wherein the step of producing a signal comprises producing a signal having forward and reverse pulses.

3. The method of claim 1 wherein the signal has a duty cycle, and further comprising the step of varying the duty cycle during the curing.

4. The method of claim 3 further comprising varying the duty cycle at least in part by pulse width modulation.

5. The method of claim 3 further comprising varying the duty cycle at least in part by pulse width modulation of the reverse pulses.

6. The method of claim 3 further comprising modulating the signal as a function of at least one of temperature and resistance.

7. The method of claim 6 wherein the electrode comprises a component of a battery.

* * * * *